RECTIFIER AND CONVERTER USING SUPERCONDUCTION

Original Filed Dec. 2, 1948 3 Sheets-Sheet 1

Inventors
ERIC ARVID ERICSSON
ANDERS OSSIAN JORGENSEN
SUNE LAMBERT OVERBY
By
Leech & Radue
Attorneys

RECTIFIER AND CONVERTER USING SUPERCONDUCTION

Original Filed Dec. 2, 1948 3 Sheets-Sheet 2

Inventors
ERIC ARVID ERICSSON
ANDERS OSSIAN JORGENSEN
SUNE LAMBERT OVERBY
By Leech & Radue Attorneys Inventors
ERIC ARVID ERICSSON
ANDERS OSSIAN JORGENSEN
SUNE LAMBERT OVERBY
By Leech & Radue Attorneys Patented Jan. 19, 1954 2,666,884

UNITED STATES PATENT OFFICE 2,666,884

RECTIFIER AND CONVERTER USING SUPERCONDUCTION

Eric Arvid Ericsson, Stockholm, Anders Ossian Jorgensen, Traneberg, and Sune Lambert Overby, Stockholm, Sweden, assignors to Telefonaktiebolaget L. M. Ericsson, Stockholm, Sweden, a Swedish company Original application December 2, 1948, Serial No. 63,052. Divided and this application August 4, 1950, Serial No. 177,714

14 Claims. (Cl. 321—45)

This invention relates to the use of an electric conductor or semi-conductor of a certain character as a controlling element in a rectifier.

It is known that the resistance of a conductor (or semiconductor) within a certain range of temperature can be varied within large limits. At low temperatures the resistance of e. g. pure bismuth or pure tungsten can be varied in the relation of 1:100,000 by means of changes in a magnetic field surrounding the conductor.

It is also known that the electrical resistance of all conductors at a certain temperature, usually in the neighborhood of the absolute zero, will decrease to zero (super conductivity). In using a certain material in the conductor, e. g. columbium-nitride, this effect is established at a somewhat higher temperature. The resistance of a so-called super conductor decreases at decreasing temperature along a curve, the jump curve, which can be situated at different temperatures in dependence of a surrounding magnetic field.

The invention will be described more closely with reference to the accompanying drawings, in which.

Figure 2:
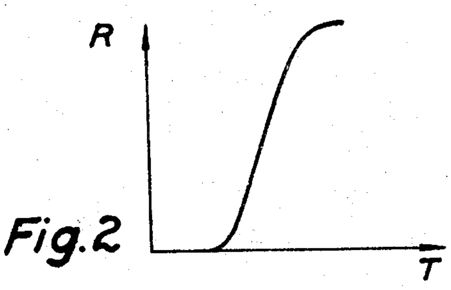
Fig. 2 shows graphically a jump curve that is the dependence of the resistance on the temperature at constant magnetic field and within a temperature range where the conductor is super conducting.
Figure 3:
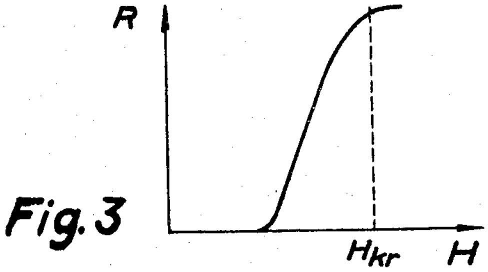
Fig. 3 is another jump curve showing the dependence of the resistance on the magnetic field at constant, low temperature within the same range.

As already mentioned, the resistance R of a super conductor can be influenced as well by changing the temperature T as by changing the magnetic field H, as is shown by means of the jump curves in Figs. 2 and 3, respectively. It is thereby of no importance whether the magnetic field originates from an outer magnetic field or from the magnetic field generated by the current in the super conductor. In a general way, the change of resistance in a super conductor is dependent on a change of the magnetic field and the temperature according to the following expression:

$$dR = \left(\frac{\delta R}{\delta H}\right)_T + dH\left(\frac{\delta R}{\delta T}\right)_H dT$$

which shows the dependence of the resistance R on: in the first term, changes of the field strength H at constant temperature, and in the second term changes in the temperature at constant field strength H.

Figure 1:
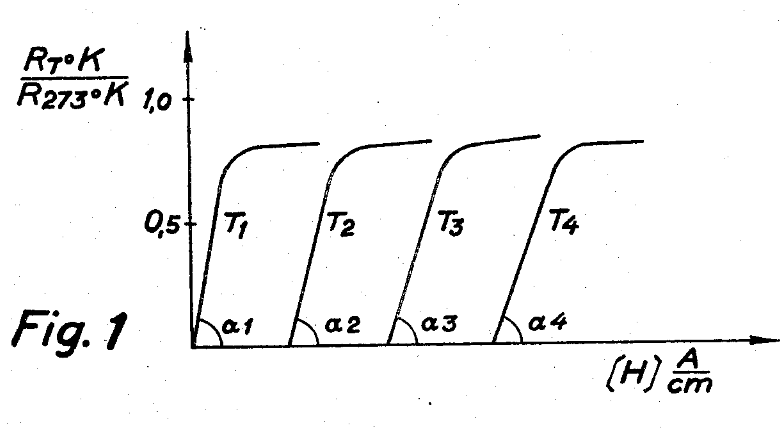
Fig. 1 shows graphically the relation between the resistance $R_{T^\circ K.}$ at a certain absolute temperature and the resistance $R_{273^\circ K.}$ at 273° K. in dependence of the absolute value of the field strength H in a magnetic field.

In Fig. 1 the relation between the resistances $R_{T^\circ K.}$ and $R_{273^\circ K.}$ is drawn in dependence on the magnetic field H for different absolute temperatures $T_1$, $T_2$, $T_3$, and $T_4$, where $T_1 > T_2 > T_3 > T_4$ and the steepness of the curve is greatest at $T_1$ and smallest at $T_4$, that is $\alpha 1 > \alpha 2 > \alpha 3 > \alpha 4$. It is thus possible to choose a convenient steepness by choosing a suitable temperature when using a super-conductor as controlling element.

It appears from the preceding, that it is advantageous that the ohmic resistance at the upper part of the jump curve is as great as possible, since thereby great variations of the resistance are possible. It is therefore advantageous to use as a super conductor columbium-nitride, the resistance of which at the upper bend of the jump curve is 75% of the ohmic resistance at room temperature, whilst the resistance of pure metal above the jump curve decreases with the fourth power of the absolute temperature and at the upper bend of the jump curve mostly amounts only to a few tenths percent of the resistance at room temperature. By using not pure metallic super conductors, the use of extreme cooling, for example by means of cooling with flowing helium, is avoided. When using columbium-nitride, it is sufficient to use flowing oxygen as cooling liquid, which can be produced much cheaper than flowing helium. It has been proved, that at least partial super conductivity exists at even so relatively high temperatures as above the boiling point of liquid air. It is even possible, by suitable thermic and chemical treatment of a super conductor, to obtain super conductivity at room temperature.

To be suitable for the purpose of the invention, the substance need not necessarily be such, that the resistance at the lower part of the used working curve is zero (super-conduction). It is possible to use certain sodium solutions, which at about −80° have a resistance characteristic, which is similar to a normal jump curve, but does not descend to zero.

Rectifying by means of dry rectifiers is usually obtained by increasing in the blocking direction the normal ohmic resistance which exists in the flow direction. By using a conductor or semi-conductor of above mentioned type as rectifying element, on the contrary, the usual ohmic resistance is arranged to form the blocking direction and means are used to make the resistance in the flow direction considerably smaller or near to zero. In such a way it is also possible, having a low resistance in the flow direction, to obtain a practically infinitely great rectifying relation, if for instance a super-conductor is used as conductor in the flow direction, the specific resistance of said conductor being at least the fifteenth power of ten ($10^{15}$) times smaller than the specific resistance of electrolytic copper.

It is not necessary to obtain complete super-conduction in the flow direction, since a rectifying relation of 1:10,000 is sufficient in most cases. It is therefore possible to use other conductors as super-conductors, e. g. pure bismuth or pure tungsten, the resistance of which can at low temperatures be changed in the relation 1:100,000 by means of changes in the magnetic field.

The two variables T and H in the above equation can be expected to control the resistance, which according to the invention will be used for rectifying of an alternating current, and respectively the conversion of a direct current into an alternating current. This is shown in Fig. 2 at constant H and variable T and in Fig. 3 at constant T and variable H. The embodiments given below, however, use only one of these possibilities, i. e. controlling by variation of the field strength H, since such a controlling seems more advantageous in most cases, owing to the fact that it can be used up to the highest frequencies without inertia, whilst thermic controlling is more or less inert, due, e. g. to heat capacity of the super conductor. These difficulties can however be surmounted at lower frequencies.

Figure 5:
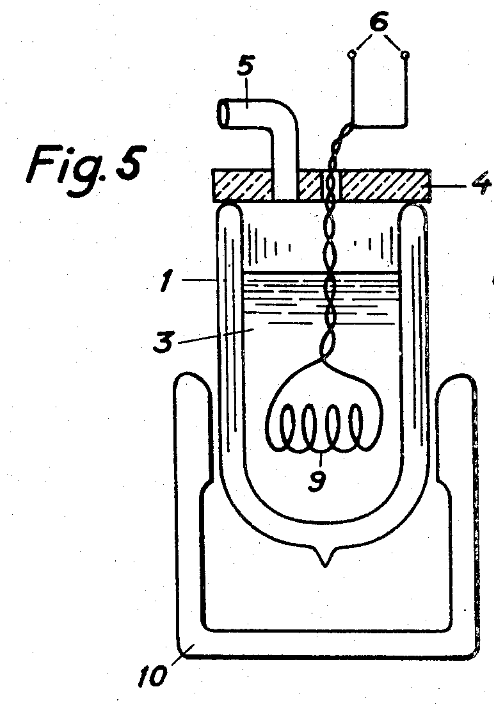
Figs. 4, 5 and 6 are sectional views of devices for rectifying an alternating current.
Figure 4:
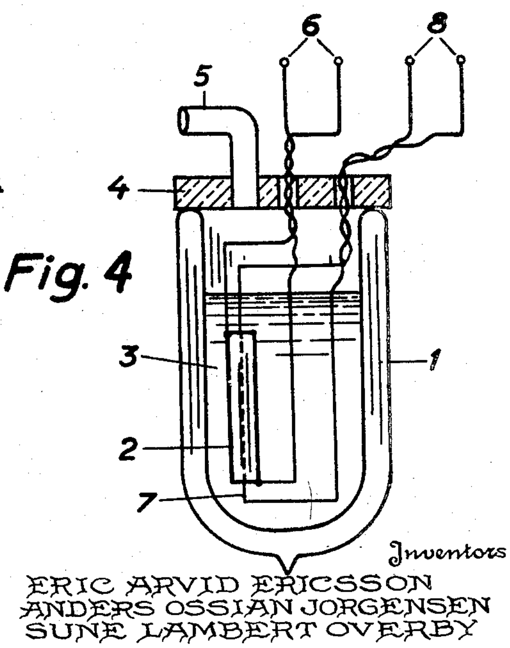

In Figs. 4 and 5, two arrangements are shown, in which the resistance is controlled directly by means of the current through the super conductor. The temperature of the super conductor is in this case lower than the temperature at which super-conduction is just obtained $T_{kr}$ (i. e. the jump temperature for $H=0$). In the device according to Fig. 4, the super conductor is shaped as a tube 2, the wall-thickness of which is so small in relation to the diameter of the tube, that it is practically possible to consider a certain average radius. A field-regulating wire 7 is stretched coaxially in said tube, which wire need not be super-conducting. All of these devices are immersed in a cooling medium 3 in a receptacle 1 with double walls, which is provided with a cover 4 and a conduit 5 representing the connection with an arrangement for keeping the temperature and the pressure of the cooling medium in the receptacle at constant suitable values. Through the field-regulating wire 7 a direct current is sent from the terminals 8 having such a strength, $I_{kr}$, that the circular magnetic field $H_{kr}$ of the wire exactly restores the ohmic resistance in the tube 2 to normal according to the curve in Fig. 3. If an alternating current is now sent through the tube 2 from terminals 6, its magnetic field is superimposed on that of the magnetic field of the wire 7, which is also circular. If the fields are directed against each other, the resulting field strength decreases, and the resistance more or less disappears. This corresponds to the flow direction. When, on the other hand, the fields cooperate, the ohmic resistance is maintained. In apparatus for small current strengths, consideration must be taken of the earth-magnetic field by introducing screening or compensation. In order that the rotary symmetric field be not disturbed, consideration must further be taken to the lines to the field-regulating wire 7, and these lines be arranged so as not to come too close to the tube. The screening may naturally be arranged in a usual manner, but the most effective screening is obtained by means of super conductors. Such a conductor is, as known, absolutely diamagnetic and can, when shaped as a screen, totally bar a magnetic field.

Instead of using a circular magnetic field from a stretched wire 7, as is shown in Fig. 4, a homogeneous field can also be used. In this case, the super conductor is for instance shaped as a coil 9, as in the design according to Fig. 5. At the same strength of alternating current a stronger magnetic field is obtained with this arrangement and it can thus be used for rectifying of feeble alternating currents. A permanent magnet 10 is used to produce the constant magnetic field, the working point ($H_{kr}$) at the upper bend of the jump curve therefore being set by means of the temperature. If an electromagnet is used, the working point can be set as well by thermic as by magnetic means, which can be an advantage in such a device for rectifying with amplitude limitation, as is described below. The arrangement of the receptacle and cooling medium in Fig. 5 are the same as have been described in connection with Fig. 4.

Figure 6:
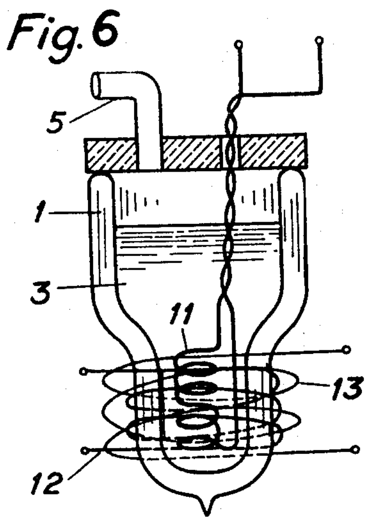

Instead of establishing the rectifying effect exclusively by means of the magnetic field generated by the super conductor itself, an auxiliary coil can be used according to the design shown in Fig. 6, where the outer devices for producing a suitable temperature are the same as in Figs. 4 and 5. The super conductor, shaped as a coil 11, is bifilarly wound to prevent the generation of a magnetic field, and its resistance is thus not influenced by current flowing through it. A direct current having such a magnitude, that a suitable working point $H_{kr}$ is produced, is fed by means of a coil 12, wound coaxially to the coil 11 round the receptacle 1. A further coil 13 is applied coaxially to the other two coils. A source of A. C. potential is connected to said last coil. The magnetic field of the last coil is positively or negatively superimposed over the direct current field from the coil 12, whereby the resistance in the super conductor, which forms the coil 11, varies between zero and ohmic resistance. If the currents through the coils 11 and 13 have the same frequency, a rectifying of the current through coil 11 is thus obtained. If the currents have the same frequency but the current in coil 13 has another curve shape than the current in coil 11, the curve-shape of the rectified current is changed through coil 11.

The device shown in Fig. 6 can be used to transform direct current into alternating current. The direct current, which is to be transformed, flows through coil 11. An alternating current having the desired frequency is sent through coil 13, which current furthermore has a current intensity which, at the given number of turns in coil 13, generates a field, which makes the coil 11 alternatively super-conducting and normal conducting. The arrangements according to Figs. 4 and 5 can also after suitable changes be used to transform direct current into alternating current as is suggested in the connection according to Fig. 8, which shows a modification of the device according to Fig. 5. The latter design has been completed with two coils 12 and 13 on the magnet 10, which coils correspond to the coils 12 and 13 in the device according to Fig. 6. The direct current generated by a source 14 of direct current is transformed into alternating current and can be taken out over a transformer 15 at the terminals 6.

Figure 7:
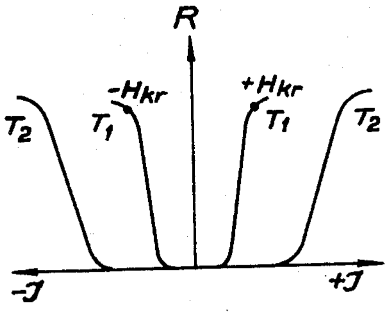
Fig. 7 shows curves of the dependence of the resistance on the magnetic field (the current) at different absolute temperatures.

Rectifying by means of superconduction according to the invention can be combined with amplitude limitation. As is illustrated in Fig. 7, the jump curves for positively or negatively directed currents I for corresponding temperatures $T_1$, $T_2$ . . . a. s. o., lie symmetrically in relation to the line $I=0$. If, for instance, the working point $H_{kr}$ at the upper bend of the jump curve corresponding to the current $I_{kr}$ is chosen at the temperature $T_1$, the alternating current will, at small amplitudes flow without resistance in the flow direction. If the amplitudes are successively increased, they will reach the other branch of the jump curve at the instantaneous value $2I_{kr}$. The amplitudes are limited at that value, which increases with decreasing temperature towards a limit value. By regulating the number of ampere-turns in the coil 11 of Fig. 6 and the temperature, it is possible to produce an amplitude limitation, which can be regulated.

Figures 8, 9:
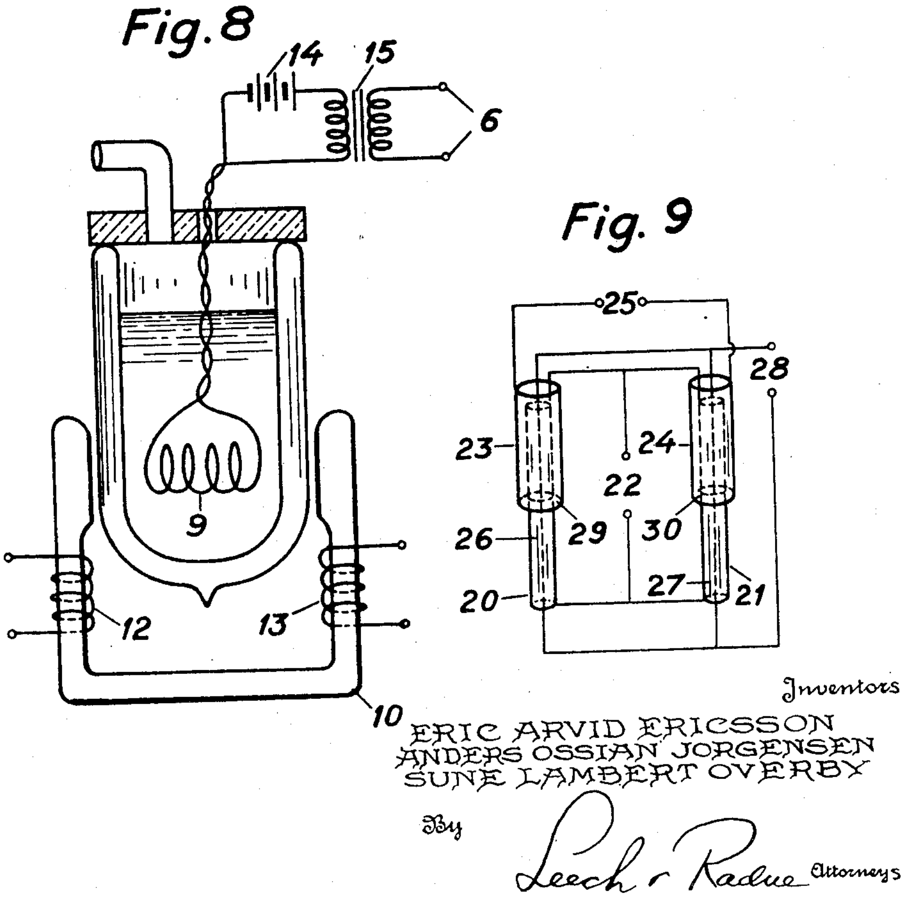
Fig. 8 is a sectional view of a device for changing direct current into alternating current.
Figs. 9 and 10 are views of single-phase full wave rectifiers.

The device according to the invention can also be built as a two-phase rectifier in bridge connection. A design of such a connection is shown in Fig. 9. Devices for cooling of the super conductors are not shown in the schematic drawing. They are supposed to be made in a way which is illustrated in principle in Figs. 4, 5, 6 and 8. The principle of rectifying for each rectifying member is the same as has been described in connection with Fig. 4. The bridge comprises four rectifying members, out of which two and two are directed in the same direction. In the shown device, they are united so that only two super conducting tubes 20, 21 with middle-point tapping are used. Such a tube with its field-regulating wire 25 acts in the shown arrangement as two rectifiers connected in series and can be used as such an aggregate also in other connections and relations.

The ends of the tubes 20, 21 are inter-connected and form a pair of terminals 22, from which the rectified current can be taken out. The alternating current is fed at the middle points of the super conducting tubes 20, 21 from a source of alternating current connected to a pair of terminals 25. In order to prevent said current from deforming the circular field around the tubes 20, 21 from the coaxial field-regulating wires 26, 27 (corresponding to 7 in Fig. 4), the connection to the tubes 20, 21 from the pair of terminals 25 is obtained by means of large concentric cylinders 23, 24 placed round said tubes and connected to the tubes 20, 21 by means of flanges 29, 30, respectively. Since the connections thus become rotary symmetrical relative to the wire 26 and 27, they cannot disturb the circular field of said wires. The wires 26, 27 are connected in parallel and connected with a pair of terminals 28 to which a source of direct current (not shown) is connected. The desired working point $H_{kr}$ (Figs. 5 and 7) can be obtained by adjusting the intensity of the current from said source.

Figure 10:
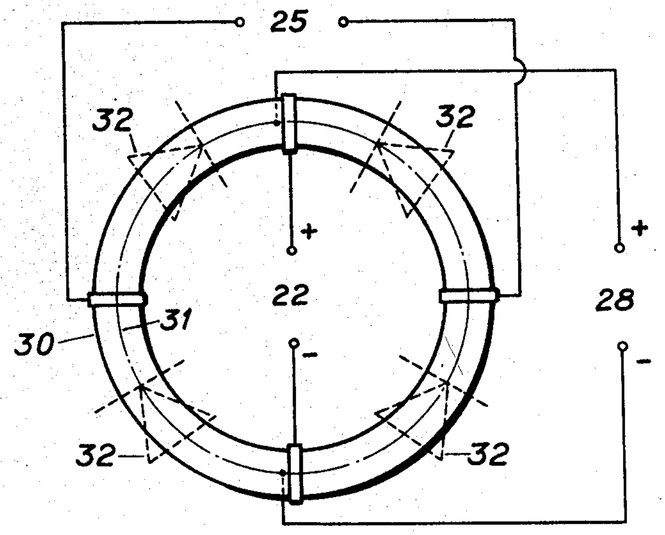

In Fig. 10, another design of a rectifying bridge according to the invention is shown. All the rectifying members (the tubes 20, 21 in Fig. 9) are in this embodiment united and bent to a super conducting tube-ring 30 with a field-regulating wire 31 applied coaxially in the tube, thereby forming a continuous ring. Two diametrically opposed points on the wire 31 are connected to a pair of terminals 28 representing a source of direct current which can be regulated. The alternating current, which has to be rectified, is fed at the pair of terminals 25, which are connected to two points lying opposite each other on the tube-ring 30, and which are 90° out of phase relatively to the connections to the field-regulating wire 31. From the ring 30 close to said wire connections the rectified alternating current is taken out from a pair of terminals 22.

Each one of the parts of the tube lying between the connection points acts as a rectifying member. If the source of direct current is connected to the terminals 28 with a polarity shown on the drawing, all the members (as is illustrated with dotted symbols 32) have their flow direction upwards, since flow is obtained in members, where the field from the currents from the terminals 25 and 28 counteract each other. The blocking is obtained when said currents cooperate. The connections to the tube 30 are made as rings round the tube. To prevent the circular field from the wire 31 from being disturbed by the connections to said wire and to the tube, measures analogous to those in Fig. 9 can be taken.

Figure 11:
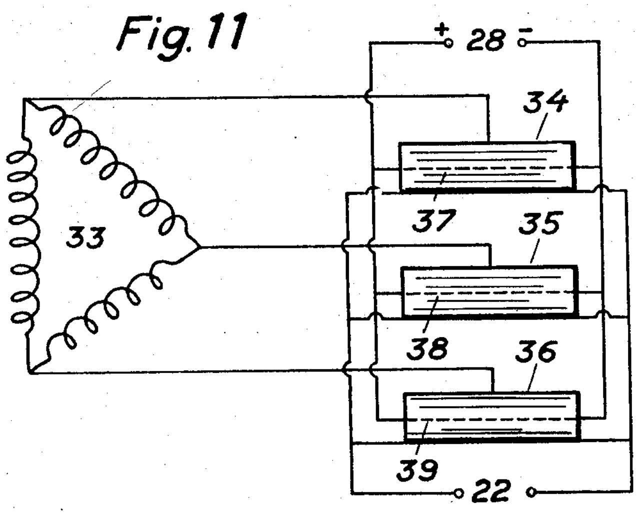
Fig. 11 is a view of a three-phase full wave rectifier.

In Fig. 11, a three-phase full-wave rectifier is connected to a Δ-connected secondary winding 33 in a transformer. The device comprises three full-wave rectifiers, each of which consists of two members connected in series, which both have flow direction to the left at the mentioned polarity of the source of controlling current at the pair of terminals 28. Said terminals are as in Fig. 10 connected to the parallel connected field regulating wires 37, 38 and 39, respectively, in the conducting tubes 34, 35, 36. The three-phase winding 33 carrying the current to be rectified, is connected with one phase to the middle of each tube. The direct current is taken from the end-points of the tubes in parallel and conducted to a pair of terminals 22.

In the devices according to Figs. 10 and 11, the super conducting tubes are supposed to be immersed in a medium keeping the temperature at a suitable constant value to produce the desired super conducting properties.

For the above described rectifying purpose the following conductors are suitable: (*a*) super conductors, which are not chemical elements, (*b*) semi-conductors, (*c*) non-stoichiometric connections, and (*d*) metallic solutions, in which the super properties appear at temperatures, which are not too low, and their resistances at the upper bend of the jump curve is a rather great part of the resistance at room temperature.

This application is a division of our copending application Serial No. 63,052, filed December 2, 1948.

We claim:

1. Apparatus for rectifying alternating current comprising in combination, a conductor, means to maintain the temperature thereof at a level substantially that at which superconduction is obtained, means to surround said conductor with a constant magnetic field having an intensity such as to substantially restore the ohmic resistance of the conductor to normal, means to surround said conductor with a magnetic field having a variable component and means to pass the alternating current to be rectified through the said conductor, said variable component being in synchronism with said alternating current.

2. Apparatus for rectifying alternating current comprising in combination, a conductor for the said alternating current and in which it is rectified, apparatus for changing the resistance of the conductor in synchronism with said current and at least in the ratio of 1:10,000, said apparatus including means to reduce the temperature of the conductor, means to surround the conductor with a magnetic field, said last means being regulated to cooperate to bring the conductor to a condition where a small change therein produces a resistance change of the stated ratio and an instrumentality to effect such small change in the condition by adjusting said last means in synchronism with the alternating current in said conductor.

3. A rectifier including in combination, a conductor in which alternating current flows and is rectified, means to reduce the temperature of the conductor to a point within a range where the resistance changes in a ratio of at least 1:10,000, means to surround the conductor with a biasing magnetic field and said conductor being surrounded with a reversing magnetic field which alternately augments and opposes the first field in synchronism with the said alternating current.

4. The rectifier as defined in claim 3 in which the reversing magnetic field is produced by the current in the conductor itself.

5. The rectifier as defined in claim 3 in which said conductor comprises a tube traversed from end to end by the said alternating current to provide the reversing magnetic field and a wire carrying direct current passing coaxially through said tube to provide the biasing magnetic field.

6. The rectifier as defined in claim 3 in which said conductor is formed as a wound coil to provide the reversing magnetic field by the alternating current which flows in it.

7. The rectifier as defined in claim 6 in which the constant magnetic field is formed by a permanent magnet.

8. The rectifier as defined in claim 3 in which the conductor is formed as a bifilar winding, a coaxial winding energized by direct current forms the biasing magnetic field and a coaxial winding energized by alternating current of the same frequency as that in the conductor forms the reversing magnetic field.

9. The rectifier as defined in claim 8 in which the wave-forms of the alternating currents in the conductor and last mentioned windings are different.

10. The rectifier as defined in claim 3 for full wave rectification in which the conductor comprises a number of tubes, means connecting the mid points of said tubes to the alternating current source for rectification and for producing the reversing field, and means connecting corresponding ends of tubes each to one side of a direct current output.

11. The rectifier as defined in claim 3 for full wave rectification in which the conductor comprises a number of tubes, means connecting the mid points of said tubes to the alternating current source for rectification and for producing the reversing field, means connecting corresponding ends of said tubes each to one side of a direct current output, and conductors coaxially arranged in said tubes and energized by direct current to provide the biasing field.

12. The rectifier as defined in claim 3 in which the conductor is formed as a toroidal tube, a direct current energized conductor within said tube, alternating current input terminals at 180° spacing on said tube and direct current output terminals spaced at mid points between the first terminals.

13. Apparatus for rectifying alternating current comprising a conductor, means to pass alternating current to be rectified into said conductor, means to maintain the temperature of the conductor within a predetermined range, means to surround the conductor with a steady magnetic field in a predetermined intensity range, said ranges being selected whereby a small change within either will cause a resistance variation within the conductor of the order of at least 1:10,000, and means acting in unison with the pulsations of said alternating current to alternately oppose and augment said magnetic field to effect said change.

14. Apparatus for converting direct current comprising a conductor connected to a source of direct current, means to maintain the temperature of the conductor within a predetermined range, means to surround the conductor with a steady magnetic field in a predetermined intensity range, said ranges being selected whereby a small change within either will cause a resistance variation within the conductor of the order of at least 1:10,000, and means to alternately oppose and augment said magnetic field at the frequency of the desired alternating current.

ERIC ARVID ERICSSON.
ANDERS OSSIAN JORGENSEN.
SUNE LAMBERT OVERBY.

References Cited in the file of this patent

UNITED STATES PATENTS

| Number | Name | Date |
|---|---|---|
| 1,679,448 | Smith | Aug. 7, 1928 |
| 1,765,607 | Ohl | June 24, 1930 |
| 1,810,539 | Sockoloff | June 16, 1931 |

OTHER REFERENCES

Communications from the Physical Laboratory of the University of Deiden, by H. K. Onnes, No. 139(f), pages 65–71, 1914; esp. page 67.

Bureau of Standards Bulletin, vol. 14, pages 301–306, by F. B. Silsbee, 1918; esp. page 302.